United States Patent Office 3,781,353
Patented Dec. 25, 1973

3,781,353
PROCESS FOR PREPARING 5-LOWER ALKANOYL BENZOPHENONES UTILIZING CERIC SALTS
Robert Ye-Fong Ning, West Caldwell, and Leo Henryk Sternbach, Upper Montclair, N.J., assignors to Hoffmann-La Roche Inc., Nutley, N.J.
No Drawing. Original application May 13, 1970, Ser. No. 37,021, now Patent No. 3,627,754. Divided and this application Sept. 8, 1971, Ser. No. 178,802
Int. Cl. C07c 103/42
U.S. Cl. 260—562 P                    5 Claims

ABSTRACT OF THE DISCLOSURE

The present invention relates to processes for the preparation of 7-lower alkanoyl-1,4-benzodiazepin-2-ones utilizing ceric salts. The 7-lower alkanoyl benzodiazepin-2-ones are known to be useful as muscle relaxants, sedatives and anticonvulsants.

CROSS-REFERENCE TO RELATED APPLICATIONS

This application is a divisional of U.S. application Ser. No. 37,021, filed May 13, 1970. U.S. application Ser. No. 37,021, now U.S. Pat. No. 3,627,754, issued Dec. 14, 1971, is related to application Ser. No. 838,677, filed July 2, 1969, now abandoned, and application Ser. No. 877,490 filed Nov. 17, 1969, now U.S. Pat. No. 3,553,206, issued Jan. 5, 1971, both in the names of Pius Anton Wehrli, Rodney Ian Fryer and Leo Henryk Sternbach. It is also related to U.S. application Ser. No. 28,935, filed Apr. 15, 1970, now U.S. Pat. No. 3,686,308 issued Aug. 22, 1972, in the names of Robert Ye-Fong Ning and Leo Henryk Sternbach, and U.S. application Ser. No. 34,532, filed May 4, 1971, in the names of Robert Ye-Fong Ning and Leo Henryk Sternbach.

DETAILED DESCRIPTION OF THE INVENTION

In our prior application Ser. No. 28,935, filed Apr. 15, 1970, referred to above, there is described a process for synthesizing 7-lower alkanoyl benzodiazepines from 5-lower alkanoyl benzophenones. Such 5-lower alkanoyl benzophenones are prepared via the oxidation of a 5-lower alkyl benzophenones with a permanganate. The so-obtained 5-lower alkanoyl benzophenone is then cryclized to the desired 7-lower alkanoyl benzodiazepine in accordance with the procedures fully described in our prior application.

By the present invention, there is provided a general procedure, which permits either the conversion of a 5-lower alkyl benzophenone to a 5-lower alkanoyl benzophenone or the conversion of a 7-lower alkyl-benzodiazepin-2-one to a 7-lower alkanoyl benzodiazepin-2-one.

Specifically, the present invention involves in one process aspect, the preparation of a compound selected from the group consisting of a compound of the formula

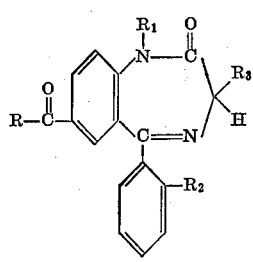

wherein $R_1$ and $R_3$ are selected from the group consisting of hydrogen and lower alkyl and $R_2$ is selected from the group consisting of hydrogen and halogen and R is H or lower alkyl via the treatment of a compound of the formula

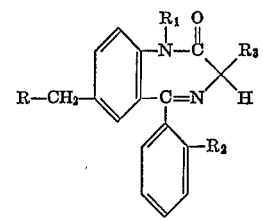

(II)

wherein R is selected from the group consisting of hydrogen and lower alkyl and $R_1$, $R_2$ and $R_3$ are as above with a ceric salt.

In another process aspect, the invention relates to the preparation of a benzophenone of the formula

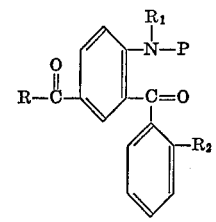

(III)

wherein R, $R_1$ and $R_2$ are as above and P is any suitable nitrogen atom protecting system via the treatment of a benzophenone of the formula

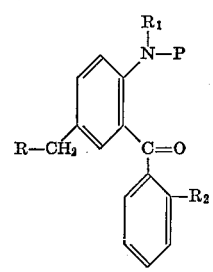

VI wherein R, $R_1$ and $R_2$ are as above with a ceric salt.

In either of the process aspects set forth above, a compound of the Formula II above or a compound of the Formula IV above is added to any appropriate inert reaction medium and to the resultant medium, there is added a ceric salt.

As a suitable inert reaction medium, there can be utilized an inert organic solvent such as a $C_1$–$C_7$ saturated fatty acid, e.g., formic acid, acetic acid, propionic acid and the like, or a dilute aqueous mineral acid such as dilute nitric acid. It should be evident that all that is required of the inert organic solvent utilized is that the ceric ions formed be stable therein and also that both the ceric salt and the starting material of the Formula II above or of the Formula IV above be soluble therein. Thus, the artisan will readily recognize the myriad of solvents suitable for the purposes of the present invention.

Ceric salts, for use in the process of the present invention, may be represented by ceric ammonium nitrate, ceric nitrate, ceric sulphate or any other suitable ceric salt.

While temperature is not critical to a successful performance of the process of the present invention, it is preferred to perform the reaction at a temperature range of from between about 0° C. to about 50° C., most preferably at room temperature.

From the above, it should be evident that the manner of bringing together the reaction partners (i.e., a ceric salt and either a compound of the Formula II above or of the Formula IV above) is not of primary importance to a successful performance of the disclosed processes and hence, the particular manner of carrying out the reaction is largely a matter of convenience.

In a preferred embodiment, the reaction is carried out in the presence of an inert organic solvent of the type set forth above. It should be appreciated that the use of a solvent will ordinarily allow the reaction to proceed in a relatively simple manner, which avoids the use of extraordinary conditions, extensive equipment and the like.

In a preferred process aspect, either a compound of the Formula II or a compound of the Formula IV above is added to an appropriate inert organic solvent which is preferably a lower fatty acid such as acetic acid. To the resultant solution there is added a ceric salt, most preferably, ceric ammonium nitrate, dissolved in water. The resultant reaction mixture is then permitted to stand at room temperature. The product of the Formula I or of the Formula III above which results is thereafter isolated.

In an especially preferred embodiment, the ceric salt utilized is ceric ammonium nitrate and the R—CH$_2$-group present on either the compound of the Formula II above or of the Formula IV above is an ethyl group so that there can be obtained respectively a 7-acetyl-benzodiazepine or a 5-acetyl-benzophenone. However, other lower alkyl group-containing compounds such as a 7-propyl, 7-butyl, 7-isobutyl, 7-pentyl benzodiazepine of the Formula II above or a 5-propyl, a 5-butyl, a 5-pentyl or a 5-isobutyl benzophenone of the Formula IV may also be utilized with equal efficaciousness so as to obtain the corresponding compound of the Formula I or III above.

In the Formula III and IV above, there is illustrated a grouping identified as P. This grouping is defined as a suitable nitrogen protecting group. This group functions to prevent the nitrogen atom on the 2-amino function of a compound of the Formula IV from participating in the reaction with the ceric salt whereby the formation of undesired side products can be avoided. Nitrogen-protecting groups are well known and can be represented by a lower alkanoyl group provided by acetic anhydride, acetyl chloride and the like. However, the literature describes a multitude of nitrogen protecting groups which would be readily recognizable by the artisan as suitable for the purposes of the present invention.

As used herein, the term "lower alkyl" comprehends a straight or branched chain hydrocarbon group containing 1–7, preferably 1–4 carbon atoms in the chain such as methyl, ethyl, propyl, butyl and the like. The term "halogen" as utilized herein is intended to connote all four forms thereof, i.e., chlorine, bromine, fluorine, or iodine unless otherwise specified. The term "lower alkanoyl" represents the acyl moiety of a lower alkanoic acid (a lower alkyl

grouping) such as acetyl, propionyl, butyryl, isobutyryl, caproyl and the like. As used herein, it can also connote the acyl moiety of formic acid.

Preferably, R$_3$ is hydrogen in Formulae I or II above. Also, in a preferred embodiment, R$_2$ in the formulae above is hydrogen or fluorine. Suitably, the lower alkanoic group in position-7 of the benzodiazepine of the Formula I above or in position-5 of the benzophenone of the Formula III above has 2–4 carbon atoms and is most preferably acetyl. Thus, the most preferred compound within the class illustrated in the formula above are those which bear an acetyl group in position-7 of the benzodiazepine either prepared directly or via the intermediate of the Formula IV above and have R$_1$ as hydrogen or lower alkyl, preferably, methyl; R$_2$ as hydrogen or fluorine and R$_3$ as hydrogen.

The compounds of the Formula III can be converted into 7-lower alkanoyl benzodiazepine as is indicated above in accordance with the procedure found in our prior application Ser. No. 28,935, filed Apr. 15, 1970, in the Patent Office entitled, "Process for the Preparation of 7-Alkanoyl Benzodiazepines."

The compounds of the Formula I are useful as anticonvulsants, sedatives and muscle relaxants. Such compounds can be formulated into pharmaceutical preparations in admixture with a capable pharmaceutical carrier and can be administered enterally or parenterally with dosage adjusted to suit the exergencies of a pharmacological situation.

The following examples are illustrated but not limitative of the present invention. All temperatures are stated in degrees centigrade.

EXAMPLE 1

A solution of 132 mg. (0.50 mmole) of 7-ethyl-1,3-dihydro-5-phenyl-1,4-benzodiazepin-2-one in 4 ml. of glacial acetic acid was mixed with a solution of 1.10 g. (2.0 mmoles) of ceric ammonium nitrate in 4 ml. of water. The mixture, a clear solution, was allowed to stand at room temperature. After one day, the mixture was diluted with 50 ml. of water and extracted twice with equal volumes of methylene chloride. The combined methylene chloride layers was washed twice with water, dried over anhydrous sodium sulfate and evaporated to dryness. The residual yellow gum was separated by preparative thin-layer chromatography (silica gel, Brinkmann PF 254, 2 mm. thick, 2 plates measuring 20 cm. x 20 cm.; ether used as eluent). 7-acetyl-1,3-dihydro-5-phenyl-1,4-benzodiazepin-2-one was isolated as a gum which crystallized from a small volume of acetonitrile as light yellow prisms, M.P. 187–189°.

In a similar manner 1,3-dihydro-7-ethyl-5-(2-fluorophenyl)-2H-1,4-benzodiazepin-2-one can be treated with ceric ammonium nitrate to give 7-acetyl-1,3-dihydro-5-(2-fluorophenyl)-2H 1,4-benzodiazepin-2-one as yellow prisms, M.P. 211–213°.

Also, in a similar manner, 1,3-dihydro-5-phenyl-7-propyl-2H-1,4-benzodiazepin-2-one can be treated with ceric ammonium nitrate to give 7-propionyl-1,3-dihydro-5-phenyl-2H-1,4-benzodiazepin-2-one.

As in this example, 7-butyl-1,3-dihydro-5-phenyl-2H-1,4-benzodiazepin-2-one can be treated with ceric ammonium nitrate to give 7-butyryl-1,3-dihydro-5-phenyl-2H-1,4-benzodiazepin-2-one.

EXAMPLE 2

A solution of 0.50 mmole of 2-acetamido-5-ethylbenzophenone in 4 ml. of glacial acetic acid was mixed with a solution of 2.0 mmoles of ceric ammonium nitrate in 4 ml. of water. The mixture, a clear solution, was allowed to stand at room temperature. After 1 day, the mixture was diluted with 50 ml. of water and extracted twice with equal volumes of methylene chloride. The combined methylene chloride layers was washed twice with water, dried over anhydrous sodium sulfate and evaporated to dryness. The residual yellow solid was washed with water. After recrystallizations from ethanol, 2-acetamido-5-acetylbenzophenone was obtained as colorless needles, M.P. 115–116°.

In a similar manner, 2-acetamido-5-butylbenzophenone can be treated with ceric ammonium nitrate to give 2-acetamido-5-butyrylbenzophenone, M.P. 125–126.5°.

What is claimed is:

1. A process for preparing a compound of the formula:

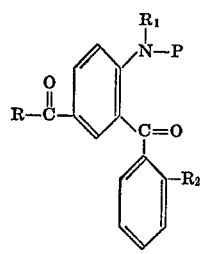

wherein R and $R_1$ are selected from the group consisting of hydrogen and lower alkyl; $R_2$ is selected from the group consisting of hydrogen and halogen; and P is lower alkanoyl which comprises treating with a ceric ion a compound of the formula

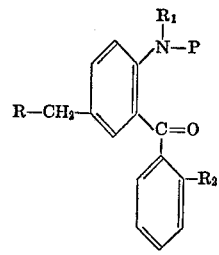

I wherein R, $R_1$, $R_2$ and P are as above dispersed in an acid solvent medium in which the ceric salt utilized to provide the ceric ions and the starting material of the Formula I above are soluble.

2. A process as in claim 1 wherein the ceric salt utilized is selected from the group consisting of ceric ammonium nitrate, ceric nitrate and ceric sulfate.

3. A process as in claim 1 wherein the formula illustrated therein R is methyl.

4. A process as in claim 3 wherein the ceric salt is selected from the group consisting of ceric ammonium nitrate, ceric nitrate and ceric sulfate.

5. A process as in claim 4 wherein in the formula illustrated R is methyl, $R_2$ is hydrogen, fluorine or chlorine and $R_1$ is selected from the group consisting of hydrogen and methyl.

References Cited
UNITED STATES PATENTS
3,553,206   1/1971   Wehrli et al. _____ 260—259

HARRY I. MOATZ, Primary Examiner